(12) United States Patent
Inada et al.

(10) Patent No.: US 6,920,261 B2
(45) Date of Patent: Jul. 19, 2005

(54) CROSS PHASE MODULATION SUPPRESSING DEVICE IN WAVELENGTH DIVISION MULTIPLEXING OPTICAL TRANSMISSION SYSTEM AND OPTICAL COMMUNICATION SYSTEM

(75) Inventors: Yoshihisa Inada, Tokyo (JP); Toshiharu Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 243 days.

(21) Appl. No.: 10/012,413

(22) Filed: Dec. 12, 2001

(65) Prior Publication Data

US 2002/0071155 A1 Jun. 13, 2002

(30) Foreign Application Priority Data

Dec. 13, 2000 (JP) ........................................ 2000-378229

(51) Int. Cl.$^7$ .................................................. G02B 6/28
(52) U.S. Cl. .......................... 385/24; 385/11; 398/152; 398/161
(58) Field of Search ................................ 385/11, 15, 18, 385/24, 31; 398/42, 45, 53, 68, 140, 147, 152, 158–161

(56) References Cited

U.S. PATENT DOCUMENTS

| | | | | |
|---|---|---|---|---|
| 6,100,831 A | * | 8/2000 | Frankel | 341/137 |
| 6,137,604 A | * | 10/2000 | Bergano | 398/1 |
| 6,208,444 B1 | * | 3/2001 | Wong et al. | 398/9 |
| 6,229,937 B1 | * | 5/2001 | Nolan et al. | 385/24 |
| 6,366,390 B1 | * | 4/2002 | King et al. | 359/264 |
| 6,400,498 B1 | * | 6/2002 | Shimomura et al. | 359/341.1 |
| 6,411,413 B1 | * | 6/2002 | Bergano | 398/200 |

FOREIGN PATENT DOCUMENTS

| | | |
|---|---|---|
| JP | 05-241104 | 9/1993 |
| JP | 07-336324 | 12/1995 |
| JP | 09-046318 | 2/1997 |
| JP | 10-135930 | 5/1998 |
| JP | 11-271817 | 10/1999 |
| JP | 2000-121855 | 4/2000 |
| JP | 2000-174699 | 6/2000 |
| JP | 2000-244402 | 9/2000 |

OTHER PUBLICATIONS

Inada et al., Suppression of XPM Effect by Polarization Interleaved Multiplexing in Long–Distance 20 Gbit/s–Based Dense WDM Transmission, Sep. 26–30, 1999, ECOC '99, vol. 2, pp. II–140–II141.

Bellotti et al., "Cross–Phase Modulation Suppressor for Multispan Dispersion–Managed WDM Transmission", Sep. 26–30, 1999, ECOC '99, vol. 1, pp. I–204–I–205.

Taga et al., "213 Gbit/s (20×10.66Gbit/s), over 9000km Transmission Experiment using Dispersion Slope Compensator", Dec. 1998, Optical Fiber Communication Conference, pp. PD13–1–PD13–4.

Japanese Office Action with partial English translation; certification.

* cited by examiner

Primary Examiner—Juliana Kang
(74) Attorney, Agent, or Firm—McGinn & Gibb, PLLC

(57) ABSTRACT

According to the cross phase modulation suppressing device of the present invention, the wavelength multiplexing optical signal from an optical fiber having polarization orthogonality between the adjacent channels is split for every channel and the split optical signals are led to delaying optical waveguides of different lengths by the AWG (Arrayed Waveguide Grating) connected to a second port of an optical circulator, and the split optical signals with each delay added are reflected by the Farraday mirrors in polarization states orthogonal to each other and again led to the delaying optical waveguides. The reflected lights are combined by the AWG and supplied to a third port of the optical circulator as the wavelength multiplexing optical signal with orthogonality of polarization states kept between the adjacent channels.

27 Claims, 12 Drawing Sheets

CROSS PHASE MODULATION SUPPRESSING DEVICE IN WAVELENGTH DIVISION MULTIPLEXING OPTICAL TRANSMISSION SYSTEM AND OPTICAL COMMUNICATION SYSTEM

BACKGROUNDS OF THE INVENTION

1. Field of the Invention

The present invention relates to a cross phase modulation suppressing device in a wavelength division multiplexing optical transmission system and an optical communication system, and more particularly to a cross phase modulation repressing device in a wavelength division multiplexing optical transmission system and an optical communication system in which signals are multiplexed so that the polarization states become orthogonal to each other between the adjacent channels.

2. Description of the Related Art

In order to cope with an increase in a communication traffic according to the recent prevalence of the Internet, a main optical fiber adopts a wavelength division multiplexing transmission system for improving the transmission capacity by passing a plurality of channels of different wavelengths within one optical fiber. In this wavelength division multiplexing transmission method, it is necessary to speed up the transmission per one channel and increase the number of multiplex channels, in order to improve the transmission capacity. Since the range of the wavelength which can be used is restricted by a limited amplifier bandwidth of an optical relay amplifier, it is necessary to narrow the channel spacing in order to multiplex more channels.

The most serious problem in the wavelength division multiplexing optical transmission with the narrow channel spacing is an effect of the cross phase modulation that is non-linear interaction between different channels. The effect of the cross phase modulation causes the waveform distortion by the interaction between difference in arrival time of transferred bits and dispersion of the optical fiber, thus deteriorating the code error rate. Since the effect of the cross phase modulation becomes stronger according as the channel spacing becomes narrower, the suppression thereof is the most important problem in pursuit of a larger capacity in the future.

As the method for suppressing the cross phase modulation, "polarization interleave multiplexing" and "method of giving a delay between each channel in a transmission line" are well known. The former "polarization interleave multiplexing" makes use of the characteristic that the power of the cross phase modulation depends on the relationship of the polarization states between the mutual signals and that the power becomes the minimum in the orthogonal polarization state. The cross phase modulation is generated in all the multiplexed channels, and the effect from a neighboring channel is generally the maximum.

In a sending end of the optical fiber, the cross phase modulation can be decreased by performing the polarization interleave multiplexing that is a method of orthogonalizing the polarization states in the adjacent channels. For example, as a reference article, there is "Y. Inada et al., European Conference on Optical Communication '99, vol. 2, p.141, 1999".

The latter "Method of giving a delay between each channel in a transmission line" is a method of giving a delay between each channel, one or several times, between a sending end and a receiving end of the optical fiber. This is the method taking into consideration that if the relative position between each channel is always constant, the effect of the cross phase modulation is accelerated. As a concrete method, there is a method in which optical signals wavelength division-multiplexed during a transmission line are once split into every channel, and combined after passing optical fibers of different lengths, and then sent to the above transmission fibers. There is another method by use of an optical fiber grating. As its reference article, there is "G. Bellotti et al., European Conference on Optical Communication '99, vol. 1, p. 204, 1999".

As the like technique of "method of giving a delay between each channel in a transmission line", there is a method in which signals are split into every channel by using each arrayed optical waveguide and the accumulated dispersion caused by a dispersion slope that is a wavelength dependency of the dispersion value that the transmission fiber has, is compensated in every wavelength by using a dispersion slope compensation unit (reference article: H. Taga et al., Optical Fiber Communication Conference, PD13, 1998).

The delay added cross phase modulation suppressing device having been proposed so far, however, has no function of keeping a relationship of the polarization states between the adjacent channels during a period from the input through the output. Therefore, when it is applied to the wavelength division multiplexing optical signals which are polarization-interleave multiplexed, there is a problem such that the polarization states between the adjacent channels are not orthogonal to each other at the output end of the optical delaying device and that the suppression effect of the cross phase modulation becomes smaller by the polarization interleave multiplexing of the signals in a transmission line thereafter.

SUMMARY OF THE INVENTION

For the purpose of solving the above conventional problem, an object of the present invention is to provide a cross phase modulation suppressing device in a wavelength division multiplexing optical transmission system and an optical communication system which can suppress the cross phase modulation between channels and improve transmission quality of wavelength multiplexing optical signals, by having a function of giving a delay between channels while keeping the orthogonality of the polarization states between the adjacent channels of the wavelength division multiplexing optical signals which are polarization-interleave multiplexed, from the input through the output by the optical delaying device, in order to realize the two cross phase modulation suppressing method at once; "polarization interleave multiplexing" and "method of giving a delay between each channel in a transmission line".

According to one aspect of the invention, a cross phase modulation suppressing device in a wavelength division multiplexing optical transmission system in which signals are multiplexed so that polarization states become orthogonal to each other between adjacent channels, comprises multi/demultiplexing means for wavelength-dividing a wavelength multiplexing optical signal into a plurality of split optical signals to output and combining the plurality of split optical signals to create the wavelength multiplexing optical signal, delaying means for adding each different delay to the plurality of the split optical signals wavelength-divided, and reflecting means for reflecting the split optical signals with each delay added in a state of orthogonalizing the polarization states thereof and again entering the split optical signals to the delaying means, wherein the split optical signals passing through the delaying means, reflected by the reflecting means, are regarded as multiplex input of the multi/demultiplexing means.

In the preferred construction, the multi/demultiplexing means splits the wavelength multiplexing optical signal into the plurality of split optical signals for every single channel.

In another preferred construction, the multi/demultiplexing means splits the wavelength multiplexing optical signal into the plurality of split optical signals between a channel group of odd number (hereinafter, odd number channel group) and a channel group of even number (hereinafter, even number channel group) in the wavelength order.

In another preferred construction, the multi/demultiplexing means includes an interleaver for splitting the wavelength multiplexing optical signal between the odd number channel group and the even number channel group.

In another preferred construction, the multi/demultiplexing means includes an interleaver for splitting the wavelength multiplexing optical signal between the odd number channel group and the even number channel group, and first and second multi/demultiplexers for splitting each of the odd number channel group and the even number channel group for every single channel.

In another preferred construction, the multi/demultiplexing means splits the wavelength multiplexing optical signal into the plurality of split optical signals in a first to a fourth channel group for every four channels.

In another preferred construction, the multi/demultiplexing means includes a first interleaver for splitting the wavelength multiplexing optical signal between the odd number channel group and the even number channel group, and a second and a third interleavers for respectively splitting the split optical signals supplied in two channel groups from the first interleaver further between the odd number channel group and the even number channel group, thereby supplying the signals in every four channels from a first channel group to a fourth channel group.

In another preferred construction, the cross phase modulation suppressing device further comprises an optical attenuator for adjusting each signal level of the split optical signals.

In another preferred construction, the cross phase modulation suppressing device further comprises an optical attenuator for adjusting each signal level of the split optical signals, wherein the multi/demultiplexing means splits the wavelength multiplexing optical signal into the plurality of split optical signals for every single channel.

In another preferred construction, the cross phase modulation suppressing device may further comprise an optical attenuator for adjusting each signal level of the split optical signals, wherein the multi/demultiplexing means includes an interleaver for splitting the wavelength multiplexing optical signal between the odd number channel group and the even number channel group, and first and second multi/demultiplexers for splitting each of the odd number channel group and the even number channel group for every single channel.

In another preferred construction, the cross phase modulation suppressing device may further comprise a dispersion compensator for performing dispersion compensation of each split optical signal.

In another preferred construction, the cross phase modulation suppressing device may further comprise a dispersion compensator for performing dispersion compensation of each split optical signal, wherein the multi/demultiplexing means splits the wavelength multiplexing optical signal into the plurality of split optical signals for every single channel.

In another preferred construction, the cross phase modulation suppressing device may further comprise a dispersion compensator for performing dispersion compensation of each split optical signal, wherein the multi/demultiplexing means includes an interleaver for splitting the wavelength multiplexing optical signal between the odd number channel group and the even number channel group, and first and second multi/demultiplexers for splitting each of the odd number channel group and the even number channel group for every single channel.

In another preferred construction, transparent wavelength characteristic in the multi/demultiplexer is of a plane flat top shape at its top.

In another preferred construction, the multi/demultiplexer is an AWG (Arrayed Waveguide Grating) capable of splitting and combining the wavelength multiplexing optical signal for every single channel at a low loss.

In another preferred construction, the multi/demultiplexer is an AWG (Arrayed Waveguide Grating) capable of splitting and combining the wavelength multiplexing optical signal for every single channel at a low loss and the transparent wavelength characteristic thereof is of a plane flat top shape at its top.

In another preferred construction, the reflecting means is the Faraday mirror.

Also, the cross phase modulation suppressing device may further comprise an optical circulator for supplying the wavelength multiplexing optical signal entered in a first port to a second port and supplying the wavelength multiplexing optical signal entered in the second port to a third port, wherein the multi/demultiplexing means is connected to the second port.

According to another aspect of the invention, an optical communication system for performing a wavelength multiplexing optical transmission between a sending end and a receiving end through an optical communication line with at least one optical relay inserted therein, in which the optical relay comprises an optical amplifier and a cross phase modulation suppressing device, and the cross phase modulation suppressing device comprises multi/demultiplexing means for wavelength-dividing a wavelength multiplexing optical signal into a plurality of split optical signals to output and combining the plurality of split optical signals to create the wavelength multiplexing optical signal, delaying means for adding each different delay to the plurality of the split optical signals wavelength-divided, and reflecting means for reflecting the split optical signals with each delay added in a state of orthogonalizing the polarization states thereof and again entering the split optical signals to the delaying means, wherein the split optical signals passing through the delaying means, reflected by the reflecting means, are regarded as multiplex input of the multi/demultiplexing means.

In the preferred construction, the multi/demultiplexing means of the cross phase modulation suppressing device splits the wavelength multiplexing optical signal into the plurality of split optical signals for every single channel.

In another preferred construction, the multi/demultiplexing means of the cross phase modulation suppressing device splits the wavelength multiplexing optical signal into the plurality of split optical signals between a channel group of odd number (hereinafter, odd number channel group) and a channel group of even number (hereinafter, even number channel group) in the wavelength order.

In another preferred construction, the multi/demultiplexing means of the cross phase modulation suppressing device is an interleaver for splitting the wavelength multiplexing optical signal between the odd number channel group and the even number channel group.

In another preferred construction, the multi/demultiplexing means of the cross phase modulation suppressing device includes an interleaver for splitting the wavelength multiplexing optical signal between the odd number channel group and the even number channel group, and first and second multi/demultiplexers for splitting each of the odd number channel group and the even number channel group for every single channel.

In another preferred construction, the multi/demultiplexing means of the cross phase modulation suppressing device splits the wavelength multiplexing optical signal into the plurality of split optical signals in a first to a fourth channel group for every four channels.

In another preferred construction, the multi/demultiplexing means of the cross phase modulation suppressing device is a first interleaver for splitting the wavelength multiplexing optical signal between the odd number channel group and the even number channel group, and a second and a third interleavers for respectively splitting the split optical signals supplied in two channel groups from the first interleaver further between the odd number channel group and the even number channel group, thereby supplying the signals in every four channels from a first channel group to a fourth channel group.

In another preferred construction, the cross phase modulation suppressing device further comprises an optical attenuator for adjusting each signal level of the split optical signals.

In another preferred construction, the cross phase modulation suppressing device further comprises an optical attenuator for adjusting each signal level of the split optical signals, and the multi/demultiplexing means of the cross phase modulation suppressing device splits the wavelength multiplexing optical signal into the plurality of split optical signals for every single channel.

In another preferred construction, the cross phase modulation suppressing device further comprises an optical attenuator for adjusting each signal level of the split optical signals, and the multi/demultiplexing means of the cross phase modulation suppressing device includes an interleaver for splitting the wavelength multiplexing optical signal between the odd number channel group and the even number channel group, and first and second multi/demultiplexers for splitting each of the odd number channel group and the even number channel group for every single channel.

In another preferred construction, the cross phase modulation suppressing device further comprises a dispersion compensator for performing dispersion compensation of each split optical signal.

In another preferred construction, the cross phase modulation suppressing device further comprises a dispersion compensator for performing dispersion compensation of each split optical signal, and the multi/demultiplexing means of the cross phase modulation suppressing device splits the wavelength multiplexing optical signal into the plurality of split optical signals for every single channel.

In another preferred construction, the cross phase modulation suppressing device further comprises a dispersion compensator for performing dispersion compensation of each split optical signal, and the multi/demultiplexing means of the cross phase modulation suppressing device includes an interleaver for splitting the wavelength multiplexing optical signal between the odd number channel group and the even number channel group, and first and second multi/demultiplexers for splitting each of the odd number channel group and the even number channel group for every single channel.

In another preferred construction, transparent wavelength characteristic in the multi/demultiplexer of the multi/demultiplexing means is of a plane flat top shape at its top.

In another preferred construction, the multi/demultiplexer of the multi/demultiplexing means is an AWG (Arrayed Waveguide Grating) capable of splitting and combining the wavelength multiplexing optical signal in every single channel at a low loss.

In another preferred construction, the multi/demultiplexer of the multi/demultiplexing means is an AWG (Arrayed Waveguide Grating) capable of splitting and combining the wavelength multiplexing optical signal for every single channel at a low loss and the transparent wavelength characteristic thereof is of a plane flat top shape at its top.

In another preferred construction, the reflecting means of the cross phase modulation suppressing device is the Faraday mirror.

In another preferred construction, the cross phase modulation suppressing device further comprises an optical circulator for supplying the wavelength multiplexing optical signal entered in a first port to a second port and supplying the wavelength multiplexing optical signal entered in the second port to a third port, and the multi/demultiplexing means is connected to the second port.

In another preferred construction, the cross phase modulation suppressing device is inserted in front of the optical amplifier.

In another preferred construction, the cross phase modulation suppressing device is inserted behind the optical amplifier.

In another preferred construction, the cross phase modulation suppressing device is inserted between the optical amplifiers.

According to the present invention, in an optical fiber transmission line, a wavelength multiplexing optical signal having polarization orthogonality between the adjacent channels is split by the wavelength into a plurality of split optical signals, these split optical signals are led to the optical waveguides of different lengths, and each different delay amount is added to the above signals. The delay-added split optical signals are reflected by the Faraday mirrors, in a state of orthogonalizing the respective polarization states, and again led to the optical waveguides. These several reflected lights are again combined. At this time, the relationship of polarization between the adjacent channels is kept in a state before split by the effect of each Faraday mirror. Since the polarization orthogonality has been kept between the adjacent channels, the signals are supplied to the optical fiber transmission line in an orthogonal state of polarization between the adjacent channels also after the output from the cross phase modulation suppressing device.

This can suppress the cross phase modulation between the channels and extremely improve the transmission characteristic of the wavelength multiplexing optical signal.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
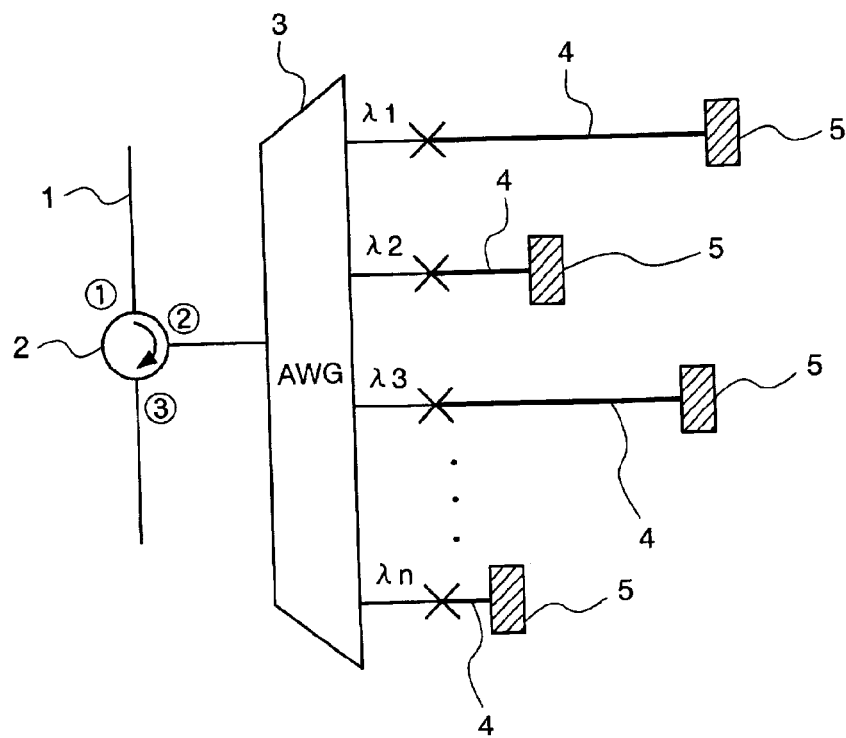
FIG. 1 is a block diagram showing a cross phase modulation suppressing device according to an embodiment of the present invention.

FIG. 1 is a block diagram showing the structure of a cross phase modulation suppressing device according to one embodiment of the present invention. In FIG. 1, the reference numeral 1 indicates an optical fiber, the reference numeral 2 indicates an optical circulator, and the reference numerals ① to ③ of the optical circulator 2 indicate the respective ports. The cross phase modulation suppressing device comprises an AWG 3 generally used as a wavelength multi/demultiplexer, a delaying optical waveguide 4, and the Faraday mirror 5. Here, a description will be made by way of example of the wavelength multiplexing optical transmission system with 8 channels (n=8: $\lambda 1$ to $\lambda 8$) as the number of wavelength multiplexing. Assume that the lights $\lambda 1$ to $\lambda 8$ of the respective channels are polarization-interleave multiplexed and that the polarization states are orthogonal to each other in the adjacent channels.

An operation of the cross phase modulation suppressing device of FIG. 1 will be described in detail. The wavelength multiplexing optical signal entered into the first port ① of the optical circulator 2 from the optical fiber 1 is supplied to the second port ②. The wavelength multiplexing optical signal led from the second port ② of the optical circulator 2 to the cross phase modulation suppressing device is split respectively in every single channel by the AWG 3. The delaying optical waveguides 4 of different lengths are connected to the 8 split optical signals $\lambda 1$ to $\lambda 8$, or the outputs from the AWG 3. The Faraday mirrors 5 are connected to the respective end portions of the delaying optical waveguides 4.

After passing through the delaying optical waveguides 4, the optical signals $\lambda 1$ to $\lambda 8$ split by the AWG 3 are respectively reflected by the Faraday mirrors 5, and after passing through the delaying optical waveguides 4 again, they are combined by the AWG 3 and supplied to the third port ③ of the optical circulator 2. Here, it is preferable that a delay caused by the delaying optical waveguide 4 should be one bit hour or more between the adjacent channels.

Figure 2:
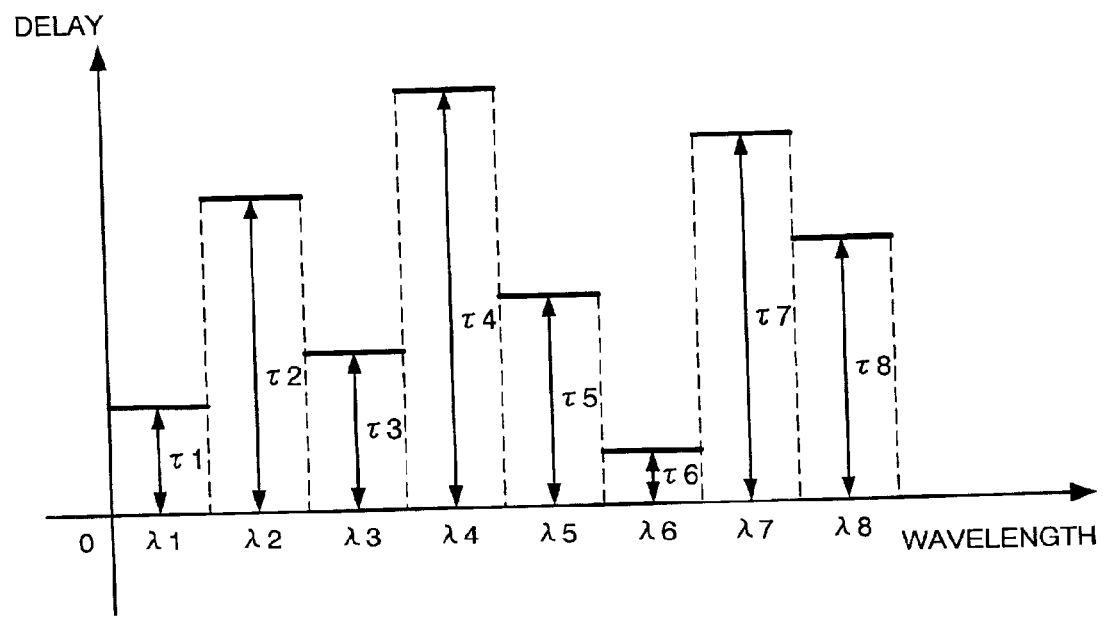
FIG. 2 is a view for use in describing a delay in every channel according to the cross phase modulation suppressing device of the present invention.

A delay added to each split optical signal by the delaying optical waveguide 4 will be described. FIG. 2 shows a relationship between the respective split optical signals $\lambda 1$ to $\lambda 8$ and the respective delays added to them. In FIG. 2, the delays $\tau 1$ to $\tau 8$ added to the respective wavelengths $\lambda 1$ to $\lambda 8$ have to be of the value at least different in the adjacent channels in order to decrease the effect of wavelength dispersion.

Figure 3:
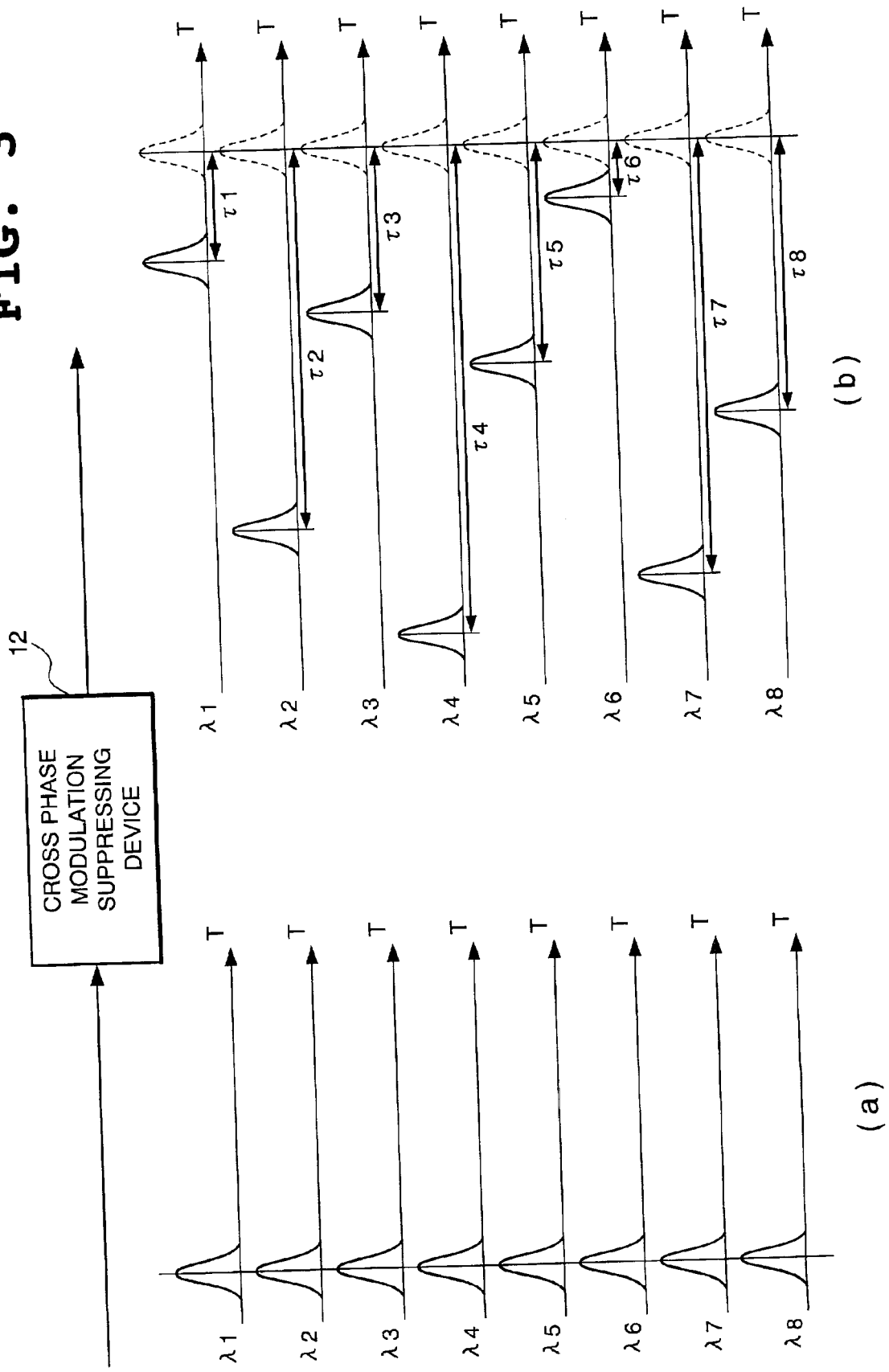
FIG. 3 is a view for use in describing a transmission time lag in every channel according to the cross phase modulation suppressing device of the present invention.

Further, the positional relationship of the pulses of the respective split optical signals after and before the passage through the cross phase modulation suppressing device is shown in FIG. 3. As illustrated in FIG. 3(a), if the time positions of the respective split optical signals stand in a line before the entry into the cross phase modulation suppressing device, the respective split optical signals $\lambda 1$ to $\lambda 8$ are deviated from the pulse positions before addition of the delays indicated by the dotted line, by the respective delays $\tau 1$ to $\tau 8$, after the passage through the cross phase modulation suppressing device. Namely, the various delays different between the channels are added to the input wavelength multiplexing optical signals, thereby varying the relative time position in the respective channels.

Figure 4:
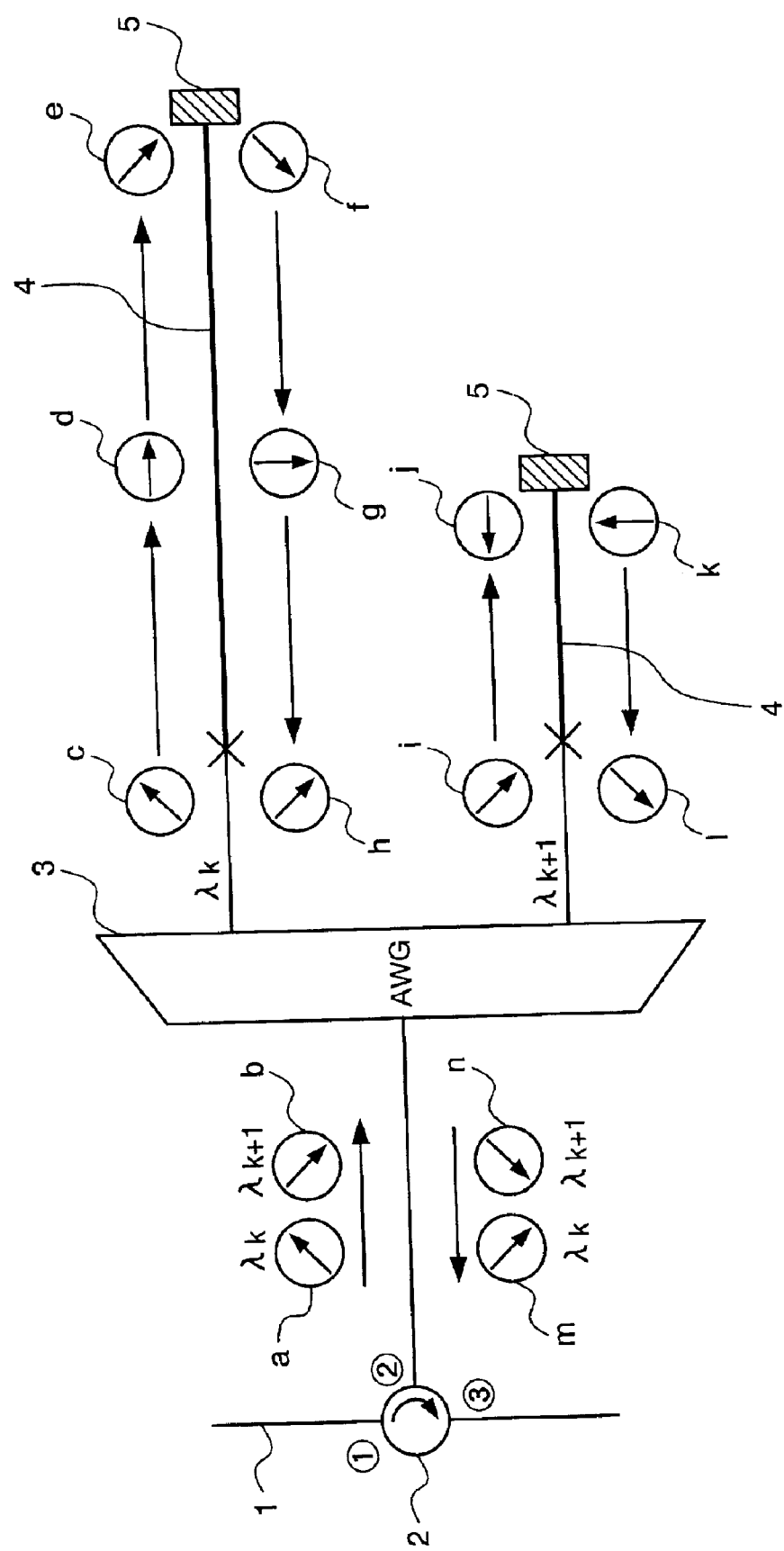
FIG. 4 is a view showing a change in the polarization state of split optical signals in the present invention.

A change in the polarization states of the split optical signals will be described in detail with reference to FIG. 4. FIG. 4 is a view showing the polarization states of the split optical signals in the cross phase modulation suppressing device of FIG. 1. In FIG. 4, the reference marks λk and λk+1 are the split optical signals of the adjacent channels and the alphabets a to m indicate the polarization states of the split optical signals λk and λk+1 schematically by the direction of the arrow. In FIG. 4, the same reference numeral is respectively attached to the same portion of FIG. 1.

The wavelength multiplexing optical signal supplied from the second port ② of the optical circulator 2 is previously multiplexed so that the polarization states may be orthogonal to each other between the adjacent channels. Therefore, the λk and the λk+1 in the adjacent channels are supplied to the AWG 3 and split, with the polarization states orthogonal to each other as illustrated by the arrows of a and b.

The split optical signals λk and λk+1 have the respective delays added by passing through the delaying optical waveguides 4 of different wavelengths. Generally, the delaying optical waveguide 4 doesn't have a function of keeping the polarization state during a period from the input through the output. After the addition of the delay, however, the split signals are reflected respectively by the function of the Faraday mirrors with the polarization states orthogonal to each other. Therefore, in the respective points within the AWG 3 and the delaying optical waveguide 4, the light directed to the right and the light directed to the left always have the polarization states orthogonal to each other. Namely, the split optical signal λk changes from a, c, d, e, f, g, h, to m in its polarization state, and a–m, c–h, d–g, and e–f are orthogonal to each other. As for the signal λk+1, b–n, i–l, and j–k are orthogonal to each other in the same way. Since a and b are primarily orthogonal to each other, m and n at the output become orthogonal to each other. In short, the relative polarization state between the channels is being kept during a period from the input through the output by the cross phase modulation suppressing device.

Figure 5:
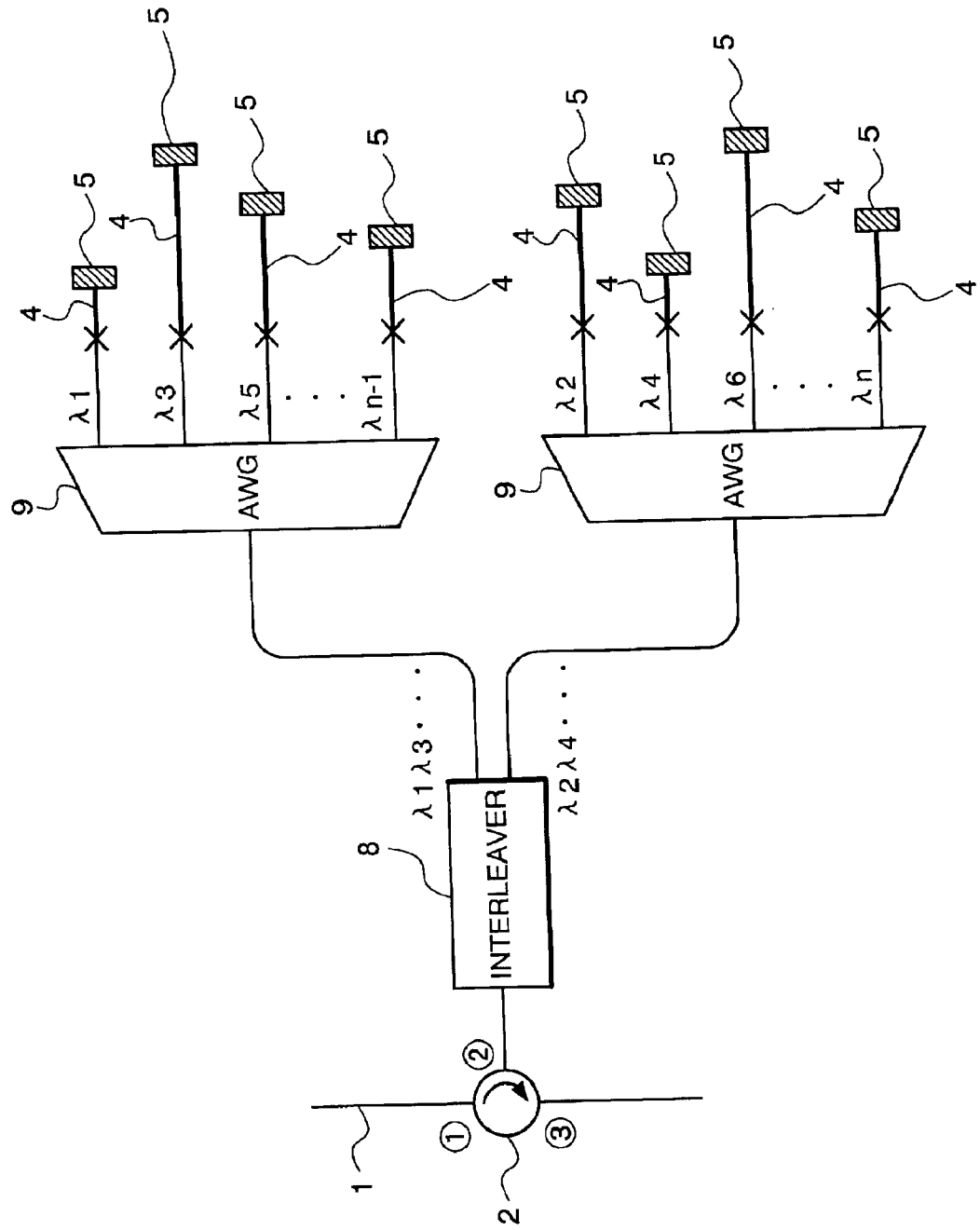
FIG. 5 is a block diagram showing a cross phase modulation suppressing device according to another embodiment of the present invention.

FIG. 5 is a block diagram showing the structure of the cross phase modulation suppressing device according to another embodiment of the present invention. The same reference numeral is respectively attached to the same portion as in FIG. 1. The wavelength multiplexing optical signals led to the cross phase modulation suppressing device by the optical circulator 2 with the polarization states orthogonal to each other between the adjacent channels are split into a channel group of odd channels (λ1, λ3, ... ) and another channel group of even channels (λ2, λ4, ... ) by the interleaver 8 and supplied to two output ports.

Figure 6:
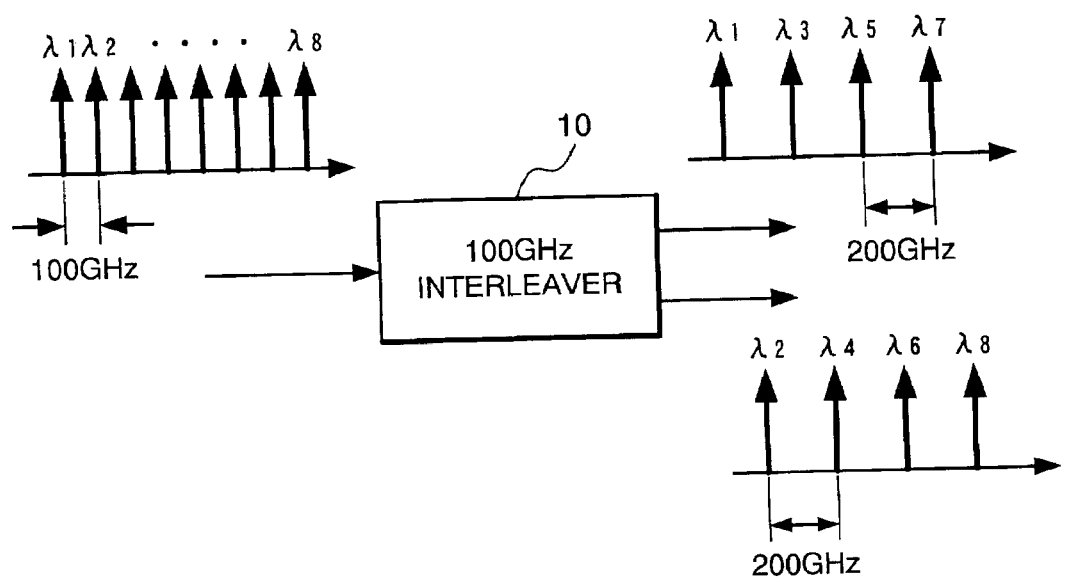
FIG. 6 is a view for use in describing a 100-GHz interleaver.

The interleaver 8 will be described briefly. FIG. 6 is a view for use in describing the operation of the 100-GHz interleaver. In FIG. 6, when the wavelength multiplexing optical signals with a 100-GHz channel spacing are launched into the 100-GHz interleaver 10, the optical signals are alternately supplied to the two output ports in every 200 GHz, or every other one wave (every other adjacent channel). As a result, the optical signals of the two output ports turn out the signals split by the 200-GHz spacing.

Returned to FIG. 5, the AWGs 9 are respectively connected to the two output ports of the interleaver 8, and the optical signals divided by the 200-GHz spacing are respectively split into every single channel. The delaying optical waveguides 4 of different lengths are connected to the split optical signals λ1, λ3, ... λn−1 and λ2, λ4, ... λn that are the output from the AWGs 9. The Faraday mirrors 5 are connected to the end portions of the delaying optical waveguides 4.

After passing through the delaying optical waveguides 4, the optical signals split by the AWGs 9 are respectively reflected by the Faraday mirrors 5, and after passing through the delaying optical waveguides 4 again, they are combined by the AWGs 9 and supplied to the third port ③ of the optical circulator 2. Here, it is preferable that a delay caused by the delaying optical waveguide 4 should be one bit hour or more between the adjacent channels. The relative polarization states between the channels are being kept during a period from the input through the output in the cross phase modulation suppressing device, as mentioned in FIG. 4.

The cross phase modulation suppressing device shown in FIG. 5 divides the wavelength multiplexing optical signals in every other one wave (every other adjacent channel) through the interleaver having a rectangular filtering characteristic more than the AWG and splits the above signals with the double channel spacing into every channel by the AWGs in order to avoid an excessive filtering caused when the AWGs split the wavelength multiplexing optical signals.

Figure 7:
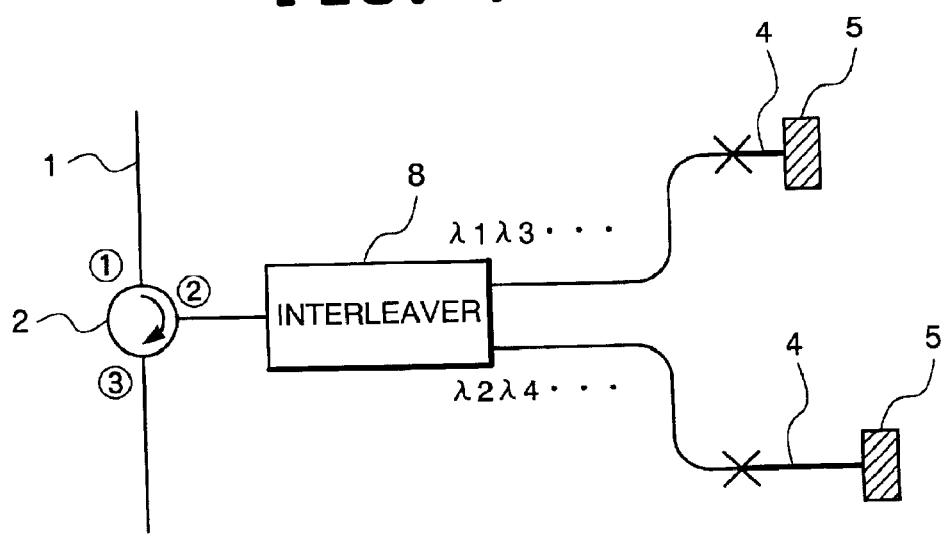
FIG. 7 is a block diagram of a cross phase modulation suppressing device according to further another embodiment of the present invention.

FIG. 7 is a block diagram showing the structure of the cross phase modulation suppressing device according to further another embodiment of the present invention, and the same reference numeral is respectively attached to the same portion as in FIG. 1. The wavelength multiplexing optical signals led to the cross phase modulation suppressing device by the optical circulator 2 with the polarization states orthogonal to each other between the adjacent channels are split into a channel group of odd channels (λ1, λ3, ... ) and another channel group of even channels (λ2, λ4, ... ) by the interleaver 8. The delaying optical waveguides 4 of different lengths are connected to the two output ports of the interleaver 8. The Faraday mirrors 5 are connected to the end portions of the delaying optical waveguides 4.

After passing through the delaying optical waveguides 4, the split optical signals taken by the interleaver 8 for every other one wave are respectively reflected by the Faraday mirrors 5, and after passing through the delaying optical waveguides 4 again, they are combined by the interleaver 8 and supplied to the third port ③ of the optical circulator 2. Here, it is preferable that a delay caused by the delaying optical waveguide 4 should be one bit hour or more between the adjacent channels. The relative polarization states between the channels are being kept during a period from the input through the output in the cross phase modulation suppressing device, as mentioned in FIG. 4.

The cross phase modulation suppressing device shown in FIG. 7 is not to add different delays to all the channels but to add the delays different between the adjacent channels. This structure is for the purpose of restraining the effect from the adjacent channel because the cross phase modulation is the most affected by the adjacent channel. According to this structure, the cross phase modulation suppressing device can be formed by less components, thereby realizing a small-sized cross phase modulation suppressing device.

Figure 8:
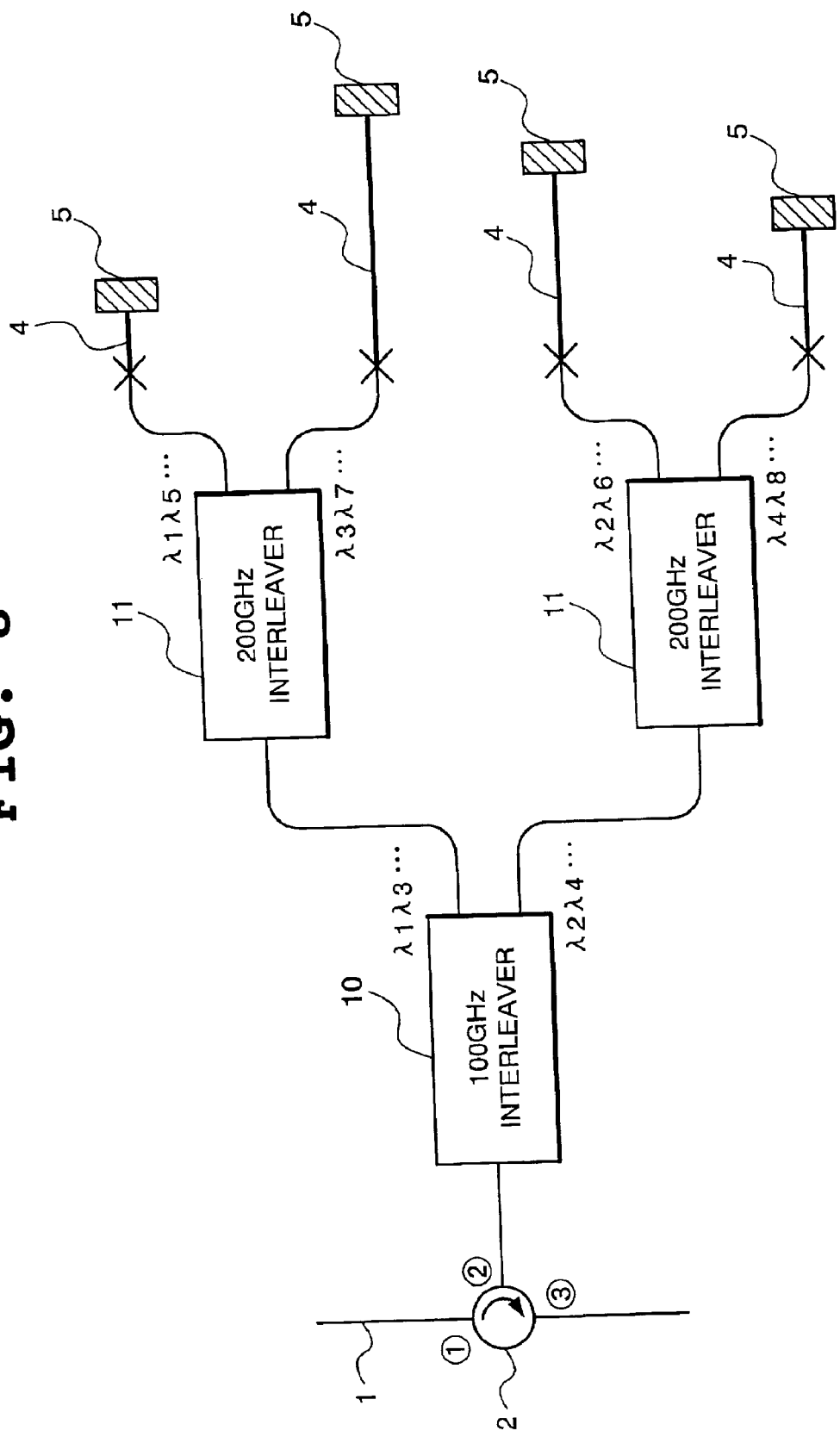
FIG. 8 is a block diagram in the case where 200-GHz interleavers are inserted in the cross phase modulation suppressing device of FIG. 7.

FIG. 8 is a block diagram of the cross phase modulation suppressing device in the case where the 100-GHz interleaver 10 is put in place of the interleaver 8 of FIG. 7 and the 200-GHz interleavers 11 are connected to the two output ports, and the same reference numeral is respectively attached to the same portion as in FIG. 1. This description will be made by way of example of a wavelength multiplexing optical transmission system having 8 channels (λ1 to λ8) of multiplexing with a 100-GHz channel spacing. Assume that the respective channels λ1 to λ8 are polarization-interleave multiplexed and that the polarization states are orthogonal to each other between the adjacent channels.

The wavelength multiplexing optical signals led to the cross phase modulation suppressing device by the optical circulator 2 are alternatively supplied to the two output ports for every other one wave (every other adjacent channel) by the 100-GHz interleaver 10. The 200-GHz interleavers 11 for further splitting the optical signals for every other one wave are respectively connected to the two output ports of the 100-GHz interleaver 10. The delaying optical waveguides 4 of different lengths are connected to the output ports of the 200-GHz interleavers 11. Further, the Farraday mirrors 5 are connected to the end portions of the delaying optical waveguides 4.

After passing through the delaying optical waveguides 4, the optical signals split by the 200-GHz interleavers 11 are respectively reflected by the Faraday mirrors 5. After passing through the delaying optical waveguides 4 again, they are combined by the 200-GHz interleavers 11 and further combined by the 100-GHz interleaver 10, and supplied to the third port ③ of the optical circulator 2. Here, it is preferable that a delay caused by the delaying optical waveguide should be one bit hour or more between the adjacent channels. The relative polarization states between the channels are being kept during a period from the input through the output in the cross phase modulation suppressing device, as mentioned in FIG. 4.

The cross phase modulation suppressing device shown in FIG. 8 is to give a different delay for every two adjacent channels. This decreases the cross phase modulation from every adjacent channel in the orthogonal polarization state and from every other adjacent channel giving the next largest effect. According to this structure, although the necessary component is increased more than in the structure of FIG. 7, the comparatively small number of the components can gain a large suppressing effect of the cross phase modulation.

Figure 9:
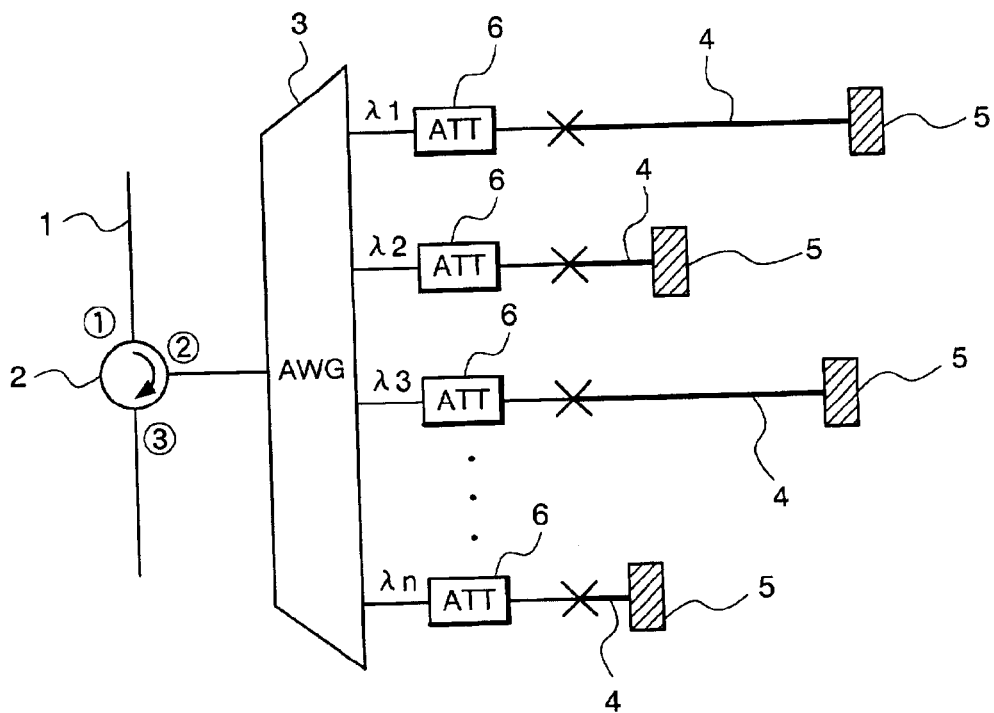
FIG. 9 is a block diagram in the case of inserting optical attenuators in the cross phase modulation suppressing device of FIG. 1.

FIG. 9 is a view showing that optical attenuators are inserted in the cross phase modulation suppressing device of FIG. 1, and the same reference numeral is respectively attached to the same portion as in FIG. 1. Intensity of optical signals can be finely adjusted in every channel by inserting the optical attenuators 6 between the respective output ports of the AWGs 3 and the delaying optical waveguides 4 in FIG. 1. In FIG. 9, since the optical attenuators 6 are provided after the AWG splitting the signals into every channel, an additional effect of compensation of wavelength gain dependency of an optical amplifier can be obtained, in addition to the suppression effect of the cross phase modulation.

Figure 10:
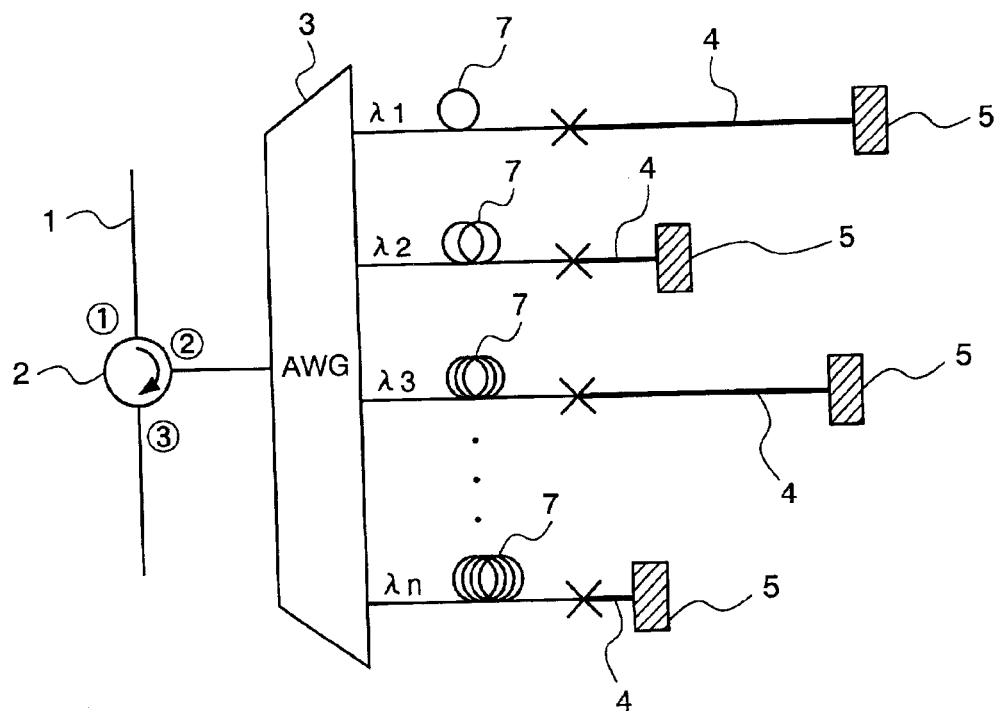
FIG. 10 is a block diagram in the case of inserting dispersion compensators in the cross phase modulation suppressing device of FIG. 1.

FIG. 10 is a view showing that dispersion compensators are inserted in the cross phase modulation suppressing device of FIG. 1, and the same reference numeral is respectively attached to the same portion as in FIG. 1. The dispersion compensators 7 are inserted between the respective output ports of the AWGs 3 and the delaying optical waveguides 4 in FIG. 1, thereby enabling a fine dispersion control in every channel. In FIG. 10, since the dispersion compensators are provided after the AWG splitting the signals into every channel, an additional effect of compensation of accumulated dispersion for every wavelength caused by the dispersion slope of the transmission fiber can be obtained, in addition to the suppression effect of the cross phase modulation.

Figure 11:
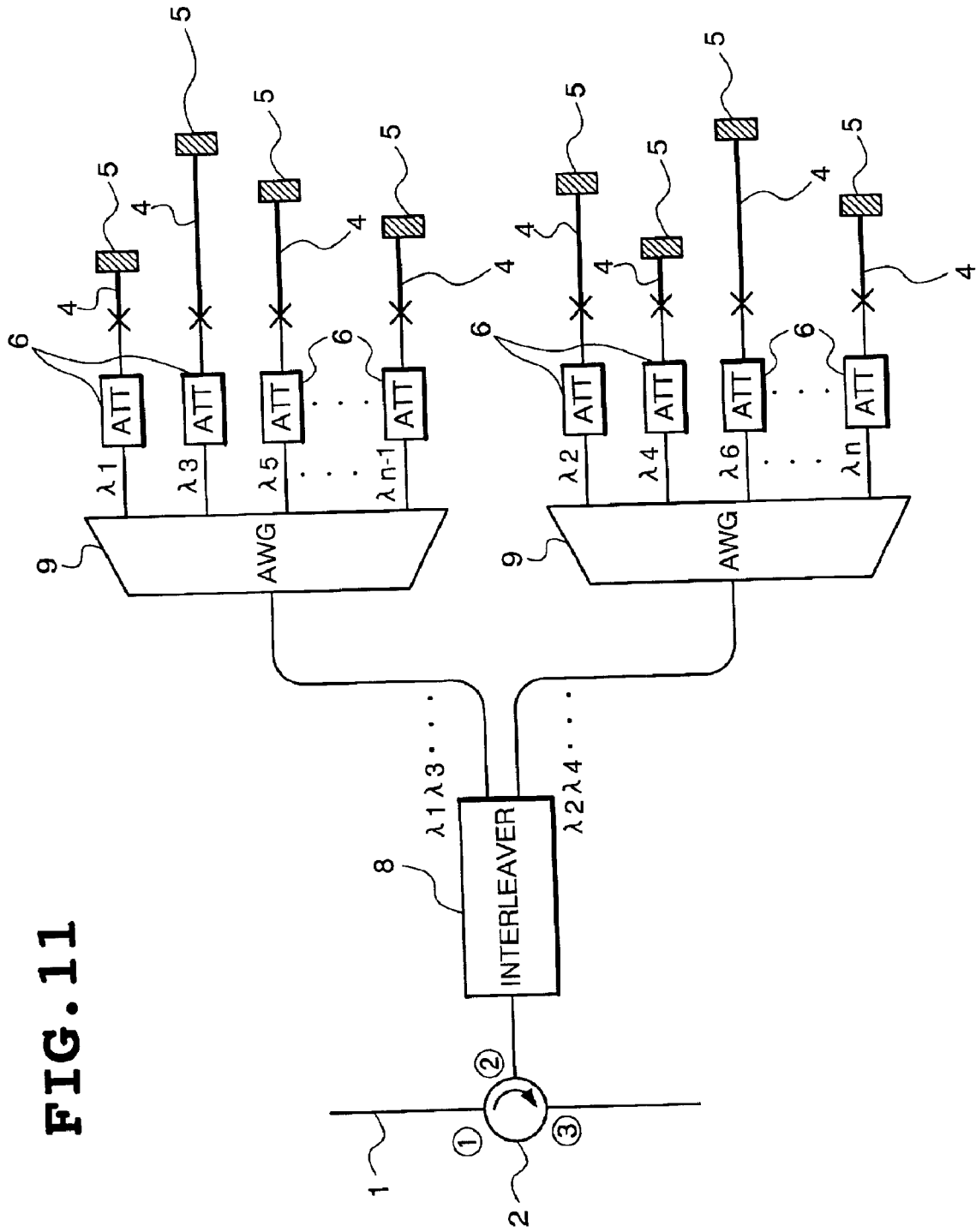
FIG. 11 is a block diagram in the case of inserting optical attenuators in the cross phase modulation suppressing device of FIG. 5.

FIG. 11 is a view showing that optical attenuators are inserted in the cross phase modulation suppressing device of FIG. 5, and the same reference numeral is respectively attached to the same portion as in FIG. 5 and FIG. 9. The optical attenuators 6 are inserted between the respective output ports of the AWGs 9 and the delaying optical waveguides 4 in FIG. 5, so to compensate the level after the passage through the optical relays placed within the optical communication line. In FIG. 11, since the optical attenuators 6 are provided after the AWGs splitting the signals into every channel, an additional effect of compensation of wavelength gain dependency of an optical amplifier can be obtained, in addition to the suppression effect of the cross phase modulation.

Figure 12:
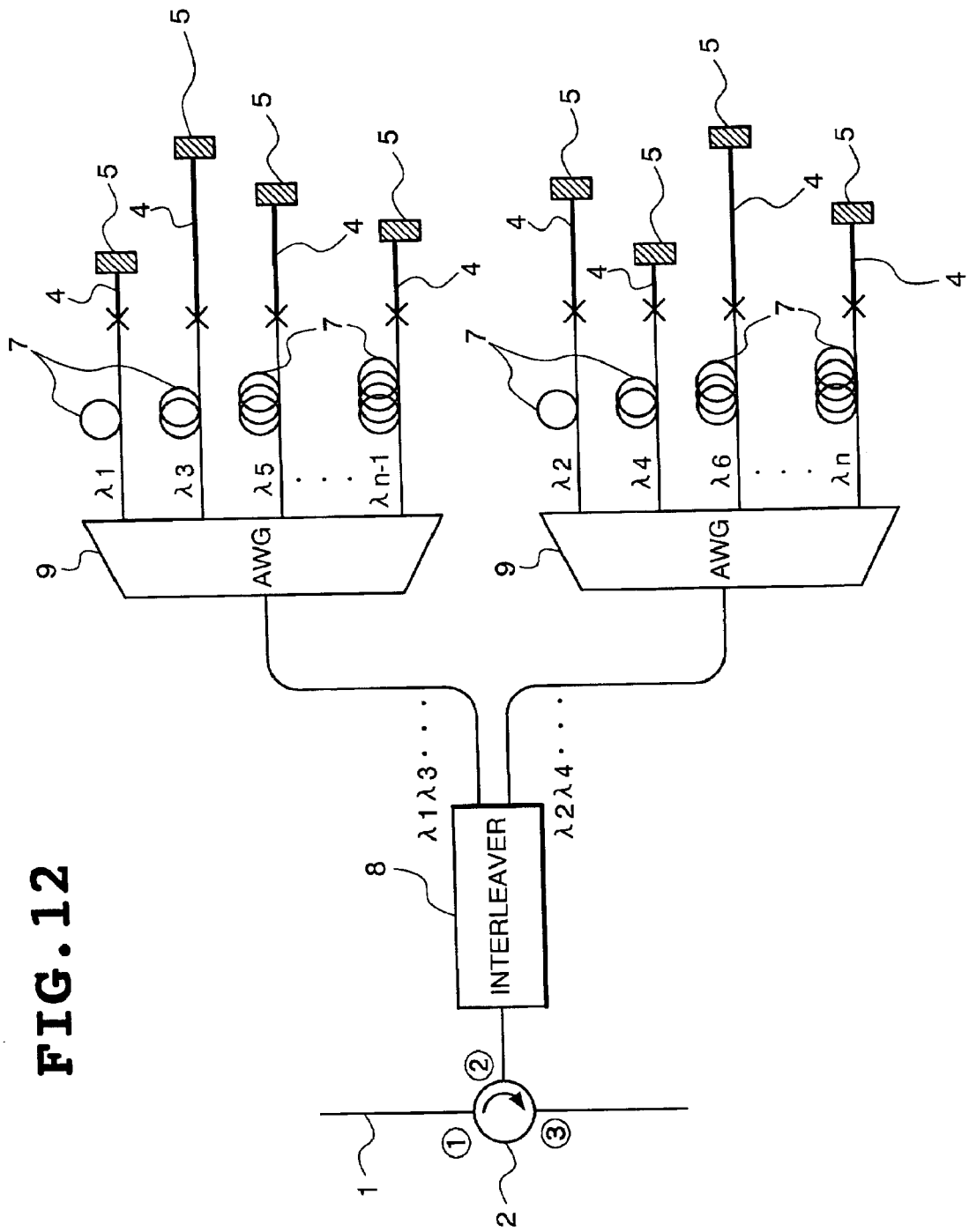
FIG. 12 is a block diagram in the case of inserting dispersion compensators in the cross phase modulation suppressing device of FIG. 5.

FIG. 12 is a view showing that dispersion compensators are inserted in the cross phase modulation suppressing device of FIG. 5, and the same reference numeral is respectively attached to the same portion as in FIG. 5 and FIG. 10. The dispersion compensators 7 are inserted between the respective output ports of the AWGs 9 and the delaying optical waveguides 4 in FIG. 5, thereby improving the dispersion characteristic different in every wavelength. In FIG. 12, since the dispersion compensators are provided after the AWGs splitting the signals into every channel, an additional effect of compensation of accumulated dispersion for every wavelength caused by the dispersion slope of the transmission fiber can be obtained, in addition to the suppression effect of the cross phase modulation.

Figure 13:
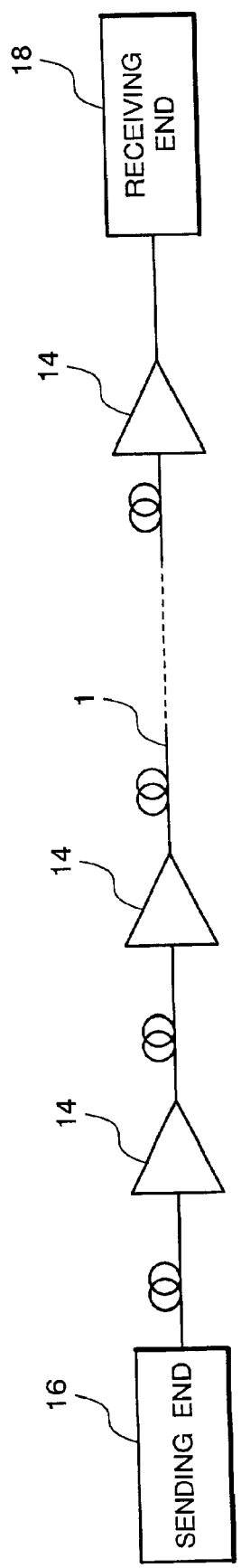
FIG. 13 is a block diagram showing the structure of an optical communication system including the cross phase modulation suppressing device of the present invention.

FIG. 13 is a block diagram showing the structure in the case of constructing an optical communication system by using the cross phase modulation suppressing device of the present invention. In FIG. 13, a sending end 16 is connected with a receiving end 18 through an optical fiber 1, thereby forming the optical communication system. At least one optical relay 14 is inserted in the optical communication line.

Figure 14A:
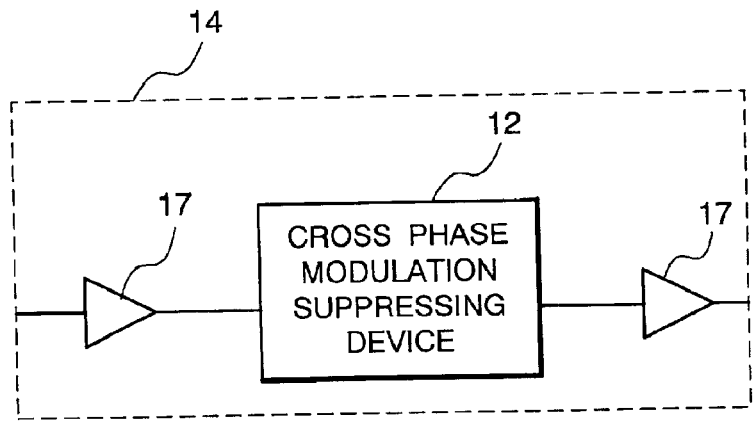
FIG. 14A is a view showing the internal structure of an optical relay of FIG. 13.
Figure 14B:
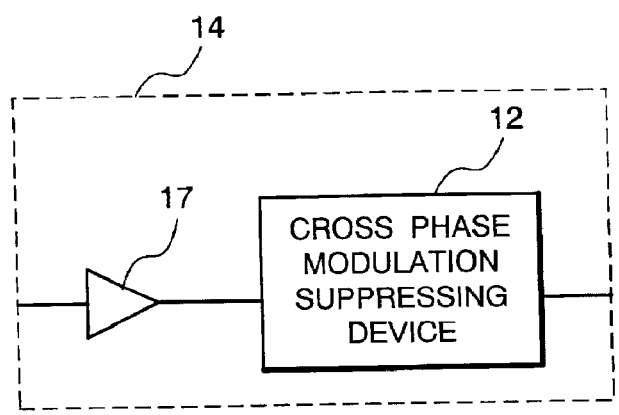
FIG. 14B is a view showing another internal structure of an optical relay of FIG. 13.
Figure 14C:
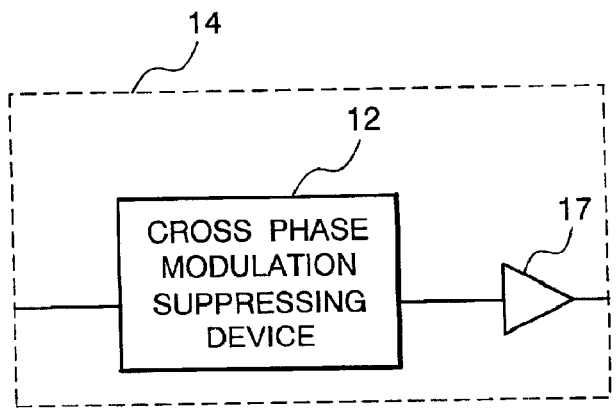
FIG. 14C is a view showing further another internal structure of an optical relay of FIG. 13.

FIGS. 14A to 14C are views respectively showing the internal structure of the optical relay 14 of FIG. 13. The optical relay 14 comprises an optical amplifier 17 and a cross phase modulation suppressing device 12 according to the present invention. In the optical relay 14, the cross phase modulation suppressing device 12 may be installed between the optical amplifiers 17, as illustrated in FIG. 14A, or it may be installed behind the optical amplifier 17, as illustrated in FIG. 14B, or it may be installed in front of the optical amplifier 17, as illustrated in FIG. 14C.

Effects in the case of inserting the cross phase modulation suppressing device according to the present invention in the optical communication line, in the optical communication system, will be described by using the numerical calculation of the WDM transmission with 5 wavelengths and 10 Gbps transmission speed. Assume that the channel spacing is 0.4 nm and that each wavelength is polarization-interleave multiplexed at the sending end. The optical fiber is generally formed by one span of 50 km including a dispersion fiber SMF (Single Mode Fiber) and an inverse dispersion fiber RDF (Reverse Dispersion Fiber) having a dispersion or a dispersion slope inverse to the SMF. No consideration is paid to the noise of the optical relay.

Figure 15:
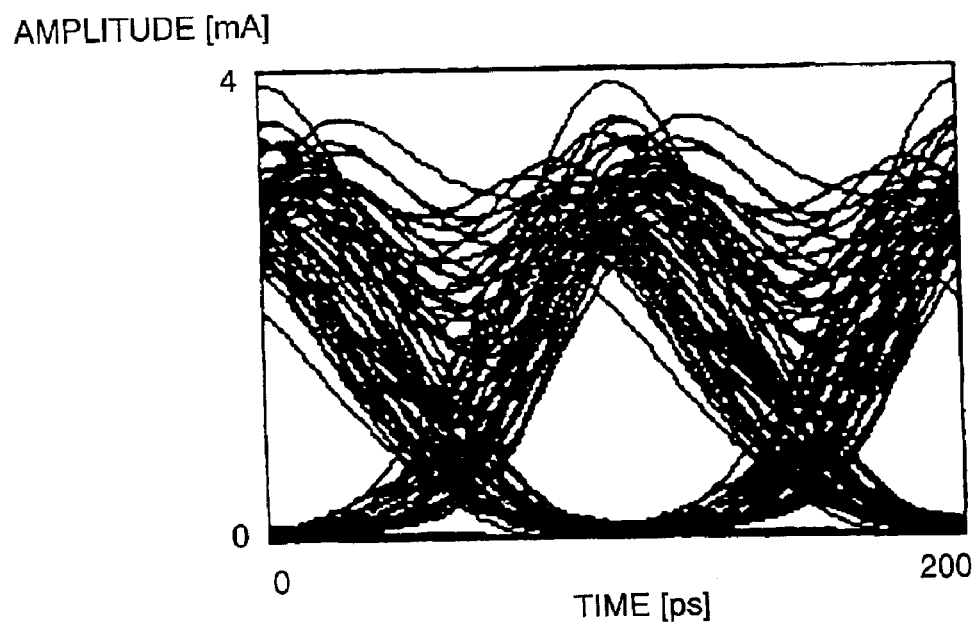
FIG. 15 is an example of eye patterns after 2,000 km transmission in the case of no use of the cross phase modulation suppressing device of the present invention.
Figure 16:
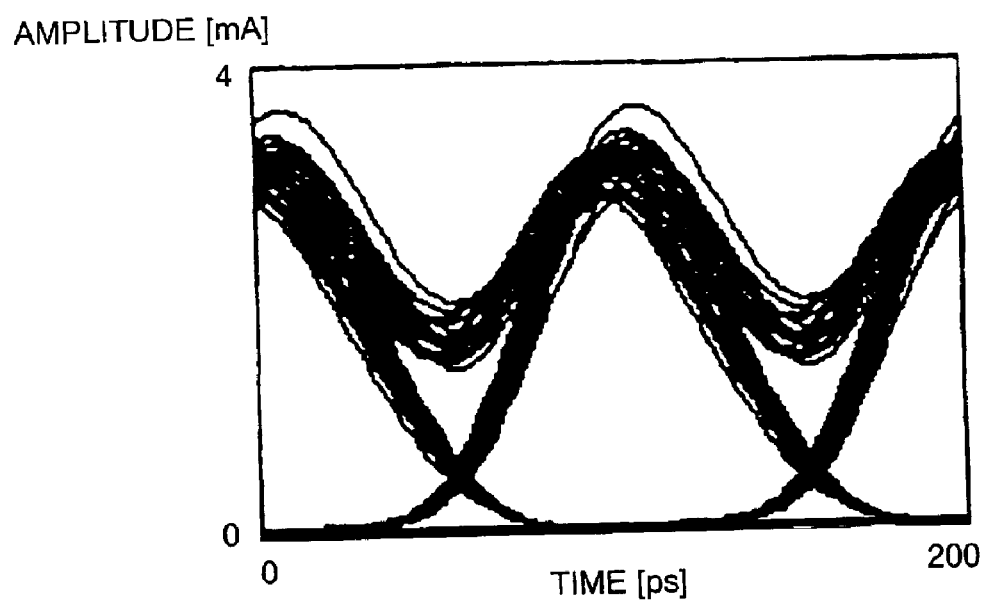
FIG. 16 is an example of eye patterns after 2,000 km transmission in the case of periodically inserting the cross phase modulation suppressing devices of the present invention.

An example of eye patterns after 2,000 km transmission is shown in FIG. 15 and FIG. 16, in the case of inserting the cross phase modulation suppressing device of the present invention in the optical communication line in every 50 km and in the case of inserting none of it there. As a result, it proves that the waveform distortion caused by the cross phase modulation can be extremely improved by periodically positioning the cross phase modulation suppressing devices according to the present invention in the optical communication line.

As mentioned above, according to the present invention, since the split optical signals with a delay added are reflected by using the Faraday mirror, the relative polarization states between wavelengths can be kept during a period from the input through the output in the cross phase modulation suppressing device. Therefore, it is possible to apply the cross phase modulation suppressing method by the polarization interleave multiplexing and the cross phase modulation suppressing method by giving various delays different in channels, at once. Accordingly, the present invention can decrease the cross phase modulation more effectively and promote larger capacity and longer distance of the optical fiber.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A cross phase modulation suppressing device in a wavelength division multiplexing optical transmission system, comprising:
    an optical circulator which supplies a wavelength multiplexing optical signal entered in a first port to a second port and supplies said wavelength multiplexing optical signal entered in said second port to a third port;
    a multi/demultiplexer which divides said wavelength multiplexing optical signal outputted from said second port of said optical circulator into a plurality of split optical signals to output, and combines said plurality of split optical signals to create said wavelength multiplexing optical signal;
    a delay element which adds different delays for each adjacent channel of said plurality of said split optical signals wavelength-divided; and
    a reflector which reflects said split optical signals with each delay added in a state of orthogonalizing polarization states thereof and again enters said split optical signals to said delay element,
    wherein said split optical signals passing through said delay element, reflected by said reflector, are inputted as a multiplex input of said multi/demultiplexer,
    wherein said reflector comprises a Faraday mirror,
    wherein polarization states of said plurality of split optical signals are orthogonal to each other between adjacent channels, and
    wherein said multi/demultiplexer includes an interleaver for splitting said wavelength multiplexing optical signal between an odd number channel group and an even number channel group, and first and second multi/demultiplexers for splitting each of said odd number channel group and said even number channel group for each channel.

2. The cross phase modulation suppressing device as set forth in claim 1, wherein said multi/demultiplexer splits said wavelength multiplexing optical signal into said plurality of split optical signals in a first to a fourth channel group for every four channels.

3. The cross phase modulation suppressing device as set forth in claim 2, wherein said multi/demultiplexer comprises:
    a first interleaver which splits said wavelength multiplexing optical signal between said odd number channel group and said even number channel group; and
    a second interleaver and a third interleaver which respectively split said split optical signals supplied in two channel groups from said first interleaver further between said odd number channel group and said even number channel group, thereby supplying the signals in every four channels from a first channel group to a fourth channel group.

4. The cross phase modulation suppressing device as set forth in claim 1, further comprising:
    an optical attenuator which adjusts each signal level of said split optical signals.

5. The cross phase modulation suppressing device as set forth in claim 1, further comprising:
    a dispersion compensator which performs dispersion compensation of said split optical signals.

6. The cross phase modulation suppressing device as set forth in claim 1, wherein a transparent wavelength characteristic in said multi/demultiplexer comprises a top including a plane flat top shape.

7. The cross phase modulation suppressing device as set forth in claim 1, wherein said multi/demultiplexer comprises an AWG (Arrayed Waveguide Grating) operable to split and combine said wavelength multiplexing optical signal for each channel at a low loss.

8. The cross phase modulation suppressing device as set forth in claim 1, wherein said multi/demultiplexer comprises an AWG (Arrayed Waveguide Grating) operable to split and combine said wavelength multiplexing optical signal for each channel at a low loss and a transparent wavelength characteristic thereof comprises a top including a plane flat top shape.

9. An optical communication system for performing a wavelength multiplexing optical transmission between a sending end and a receiving end through an optical communication line with at least one optical relay inserted therein,
    wherein said optical relay comprises an optical amplifier and a cross phase modulation suppressing device, and
    wherein said cross phase modulation suppressing device comprises:
        an optical circulator for supplying a wavelength multiplexing optical signal entered in a first port to a second port and supplying said wavelength multiplexing optical signal entered in said second port to a third port,
        a multi/demultiplexer which divides said wavelength multiplexing optical signal outputted from said second port of said optical circulator into a plurality of split optical signals to output and combine said plurality of split optical signals to create said wavelength multiplexing optical signal;
        a delay element which adds different delays for each adjacent channel of said plurality of said split optical signals wavelength-divided; and
        a reflector which reflects said split optical signals with each delay added in a state of orthogonalizing polarization states thereof and again enters said split optical signals to said delay element, wherein said split optical signals passing through said delay element, reflected by said reflector, are inputted as a multiplex input of said multi/demultiplexer, wherein polarization states of said plurality of split optical signals are orthogonal to each other between adjacent channels, and wherein said multi/demultiplexer of said cross phase modulation suppressing device includes an interleaver for splitting said wavelength multiplexing optical signal between an odd number channel group and an even number channel group, and first and second multi/demultiplexers for splitting each of said odd number channel group and said even number channel group for each channel.

10. The optical communication system as set forth in claim 9, wherein said multi/demultiplexer of said cross phase modulation suppressing device splits said wavelength multiplexing optical signal into said plurality of split optical signals in a first to a fourth channel group for every four channels.

11. The optical communication system as set forth in claim 10, wherein said multi/demultiplexer of said cross phase modulation suppressing device comprises:

a first interleaver which splits said wavelength multiplexing optical signal between said odd number channel group and said even number channel group; and a second interleaver and a third interleaver which respectively split said split optical signals supplied in two channel groups from said first interleaver further between said odd number channel group and said even number channel group, thereby supplying the signals in every four channels from a first channel group to a fourth channel group.

12. The optical communication system as set forth in claim 9, wherein said cross phase modulation suppressing device further comprises:

an optical attenuator which adjusts each signal level of said split optical signals.

13. The optical communication system as set forth in claim 9, wherein said cross phase modulation suppressing device further comprises:

a dispersion compensator which performs dispersion compensation of each split optical signal.

14. The optical communication system as set forth in claim 9, wherein a transparent wavelength characteristic in said multi/demultiplexer comprises a top including a plane flat top shape.

15. The optical communication system as set forth in claim 9, wherein said multi/demultiplexer comprises an AWG (Arrayed Waveguide Grating) operable to split and combine said wavelength multiplexing optical signal in each channel at a low loss.

16. The optical communication system as set forth in claim 9, wherein said multi/demultiplexer comprises an AWG (Arrayed Waveguide Grating) operable to split and combine said wavelength multiplexing optical signal for each channel at a low loss and a transparent wavelength characteristic thereof comprises a top including a plane flat top shape.

17. The optical communication system as set forth in claim 9, wherein said reflector of said cross phase modulation suppressing device comprises a Faraday mirror.

18. The optical communication system as set forth in claim 9, wherein said cross phase modulation suppressing device is inserted in front of said optical amplifier.

19. The optical communication system as set forth in claim 9, wherein said cross phase modulation suppressing device is inserted behind said optical amplifier.

20. The optical communication system as set forth in claim 9, wherein said cross phase modulation suppressing device is inserted between said optical amplifiers.

21. A cross phase modulation suppressing device comprising:

an optical circulator which supplies a wavelength multiplexing optical signal entered in a first port to a second port and supplies said wavelength multiplexing optical signal entered in said second port to a third port;

a multi/demultiplexer that divides said wavelength multiplexing optical signal outputted from said second port of said optical circulator into a plurality of split optical signals, combines said plurality of split optical signals, and outputs said wavelength multiplexing optical signal;

a delay element that adds delays for each adjacent channel of said plurality of said split optical signals, wherein said plurality of said split optical signals comprise different delays; and a reflector that reflects one of said plurality of split optical signals, wherein said one of said plurality of split optical signals returns through said delay element and inputs a multiplex input of said multi/demultiplexer, wherein said plurality of split optical signals comprises orthogonal polarization states with respect to each other between adjacent channels, wherein said reflector comprises a Faraday mirror, and wherein said multi/demultiplexer includes an interleaver for splitting said wavelength multiplexing optical signal between an odd number channel group and an even number channel group, and first and second multi/demultiplexers for splitting each of said odd number channel group and said even number channel group for each channel.

22. The cross phase modulation suppressing device as set forth in claim 21, wherein said delay element comprises a plurality of optical waveguides.

23. The cross phase modulation suppressing device as set forth in claim 21, wherein said delay element comprises a plurality of delaying optical waveguides including different lengths.

24. An optical communication system for performing a wavelength multiplexing optical transmission, comprising:

a sending end; and a receiving end connected to said sending end through an optical communication line, wherein said optical communication line comprises at least one optical relay, wherein said at least one optical relay comprises a cross phase modulation suppressing device, wherein said cross phase modulation suppressing device comprises:

an optical circulator for supplying a wavelength multiplexing optical signal entered in a first port to a second port and supplying said wavelength multiplexing optical signal entered in said second port to a third port;

a multi/demultiplexer that divides said wavelength multiplexing optical signal outputted from said second port of said optical circulator into a plurality of split optical signals, combines said plurality of split optical signals, and outputs said wavelength multiplexing optical signal;

a delay element that adds delays for each adjacent channel of said plurality of said split optical signals, wherein said plurality of said split optical signals comprise different delays; and a reflector that reflects one of said split optical signals, wherein said one of said split optical signals returns through said delayer and inputs a multiplex input of said multi/demultiplexer, wherein said plurality of split optical signals comprise orthogonal polarization states with respect to each other between adjacent channels, and wherein said multi/demultiplexer of said cross phase modulation suppressing device includes an interleaver for splitting said wavelength multiplexing optical signal between an odd number channel group, and an even number channel group, and first and second multi/demultiplexers for splitting each of said odd number channel group and said even number channel group for each channel.

25. The optical communication system as set forth in claim 24, wherein said at least one optical relay further comprises an optical amplifier.

26. The optical communication system as set forth in claim 24, wherein said delay element comprises a plurality of optical waveguides.

27. The optical communication system as set forth in claim 24, wherein said delay element comprises a plurality of delaying optical waveguides including different lengths.

* * * * *